US006577401B1

(12) United States Patent
Matsumoto

(10) Patent No.: US 6,577,401 B1

(45) Date of Patent: Jun. 10, 2003

(54) ENCODER DISPLACEMENT MEASURING APPARATUS WITH LIQUID CRYSTAL

(75) Inventor: Kenji Matsumoto, Tokorozawa (JP)

(73) Assignee: Citizen Watch Co., Ltd., Tokyo (JP)

( * ) Notice: Subject to any disclaimer, the term of this patent is extended or adjusted under 35 U.S.C. 154(b) by 126 days.

(21) Appl. No.: 09/674,157

(22) PCT Filed: Sep. 14, 2000

(86) PCT No.: PCT/JP00/06326

§ 371 (c)(1), (2), (4) Date: Oct. 27, 2000

(87) PCT Pub. No.: WO02/23132

PCT Pub. Date: Mar. 21, 2002

(51) Int. Cl.[7] .................................................. G01B 9/02

(52) U.S. Cl. ...................................................... 356/499

(58) Field of Search ................................ 356/499, 488, 356/494, 521; 250/231.14, 231.16, 237 G

(56) References Cited

U.S. PATENT DOCUMENTS 5,035,507 A 7/1991 Nishioki et al. ............ 356/356
5,120,132 A * 6/1992 Spies et al. ............. 250/237 G
5,141,317 A * 8/1992 Bollhagen et al. .......... 356/488

FOREIGN PATENT DOCUMENTS

JP 3-2780227 12/1991
JP 5-180667 7/1993

* cited by examiner

*Primary Examiner*—Samuel A. Turner
*Assistant Examiner*—Michael A. Lyons
(74) *Attorney, Agent, or Firm*—Finnegan, Henderson, Farabow, Garrett & Dunner, L.L.P.

(57) ABSTRACT

In a displacement measuring apparatus for detecting a displacement of a measured object by using a scale that moves with the measured object, the cost of this apparatus is reduced by decreasing the number of parts of an optical system. In this displacement measuring . apparatus, a light beam emitted from a coherent light source, as represented by a laser diode, is split into two light beams of a transmission light and a diffracted light or into a regularly-reflected light and a reflection-diffracted light by a diffraction grating that is marked with lines in a direction perpendicular to the movement direction of the scale. A liquid crystal device for carrying out a phase modulation to obtain a desired phase difference between light beams is inserted into an optical path of one of the two light beams, One of the two light beams is transmitted through a liquid crystal device, and the other light beam proceeds straight. These two light beams are reflected by a reflection mirror provided at the end of each optical path, and are incident again to the incident point of the diffraction grating. The two light beams incident again are recombined together by the diffraction grating, and become an interference light. The interference light enters a photoelectric conversion element, and the displacement of the diffraction grating is measured based on a plurality of signals output from the photoelectric conversion element. The structure becomes simple as the polarized-beam dividing elements and polarizers are not necessary.

2 Claims, 6 Drawing Sheets

ENCODER DISPLACEMENT MEASURING APPARATUS WITH LIQUID CRYSTAL

BACKGROUND OF THE INVENTION

1. Field of the Invention

The present invention relates to a displacement measuring apparatus and, more particularly, to an apparatus for converting two light beams that have been diffracted by a diffraction grating into electric signals by a photoelectric conversion element and for measuring a displacement of the diffraction grating with high accuracy.

2. Description of Related Art

As an apparatus for measuring a displacement with high accuracy, there has conventionally been known a displacement measuring apparatus called a linear gauge. Generally, a photoelectric transmission type linear encoder has been employed for this displacement measuring apparatus. The photoelectric transmission type linear encoder consists of a light source (a light-emitting diode) and a light-receiving element (a photodiode) facing each other, a fixed index scale having a scale of pitches in the order of $\mu$m and provided in a space between the light source and the light-receiving element, and a main scale that moves linked with the move of a measured object and having the same pitches as those of the fixed index scale. According to this displacement measuring apparatus, when the main scale moves linked with the move of the measured object, a light that is transmitted through the window of the index scale is interrupted intermittently. Based on the brightness and darkness formed by this intermittent interference of the light, two sinusoidal wave signals that have a phase difference of $\pi/2$ (rad) are output in the same cycle. Therefore, the distance of a movement of the main scale has been electrically detected from these signals.

In contrast to this photoelectric transmission type displacement measuring apparatus, in recent years, a displacement measuring apparatus has been put into practical use that has a diffraction grating with a fine pitch and a scale that moves with the movement of a measured object. According to this displacement measuring apparatus, a coherent light beam is irradiated onto the diffraction grating on the scale, and the apparatus measures a change in the intensity of the interference light between beams diffracted by the diffraction grating. The displacement of the scale is measured based on this effect. According to the displacement measuring apparatus that uses the diffraction grating, a beam splitter splits a light beam emitted from the coherent light source into two light beams. Each light beam is incident to the diffraction grating on the scale, Another beam splitter combines the light beams diffracted by the diffraction grating. Then, a photoelectric conversion element measures the intensity of the interference light. In order to measure the displacement with high resolution, it is necessary to provide a diffraction grating having a very fine pitch with a magnitude the same as the wavelength of the light source. For this purpose, a diffraction grating is generally used that is holographically recorded with interference fringes based on the interference of two light beams from a laser. The optical system of the displacement measuring apparatus is broadly classified into a transmission type apparatus that detects interference between diffracted light beams that are transmitted through the diffraction grating, and a reflection type apparatus that detects interference between diffracted light beams that are reflected by mirrors.

A conventional transmission type displacement measuring apparatus 50 will be explained in detail with reference to FIG. 1. The transmission type displacement measuring apparatus 50 has a scale 14 that moves with a member of which the displacement is to be measured. On this scale 14, there is provided a diffraction grating 15 marked with lines in a direction perpendicular to a move direction of the scale. On one of the two sides of this scale 14, there are a polarized-beam splitter 51 and a coherent light source 11 as represented by a laser diode. A collimating lens 12 is provided between the light source 11 and the polarizing beam splitter 51. On the other of the two sides of this scale 14, a beam splitter 52 and photoelectric conversion elements 18A and 18B are disposed. A quarter-wave plate 17 and a polarizer 53A are disposed between the beam splitter 52 and the photoelectric conversion elements 18A. A polarizer 53B is disposed between the beam splitter 52 and the photoelectric conversion element 18B.

In the displacement measuring apparatus 50 having the above-described structure, a light beam that has been emitted from the light source 11 is adjusted into a collimated beam by the collimating lens 12, and the beam is split into two diffracted lights by the polarizing beam splitter 51. The light beams split into two are then incident to the scale 14 respectively, and reach the diffraction grating 15. These two light beams are diffracted by the diffraction grating 15. First-order diffracted lights having± signs diffracted by the diffraction grating 15 (it is possible to utilize high-order diffracted lights, but generally, ± first-order diffracted lights having high diffraction efficiency are used) are combined together by the beam splitter 52. The combined diffracted light beams are incident to the polarizers 53A and 53B respectively. The beams incident to the polarizers 53A and 53B are converted into linearly polarized beams respectively. The polarized beams are incident to the photoelectric conversion elements 18A and 18B as interference light beams of components of the same polarization directions respectively. These interference lights are converted into electric signals, which are then used for detecting the displacement distance.

The intensity of the interference light becomes a sinusoidal wave signal having a displacement of d/2 as one cycle when the pitch of the diffraction grating 15 is expressed as d. One of the two combined light beams is transmitted through the quarter-wave plate 17 to obtain a signal of which the phase is deviated by $\pi/2$ (rad) from the phase of the other interference signal, This signal is used to detect the proceeding direction of the scale 14 and to detect the phase of the output signal. For example, when the pitch of the diffraction grating is 0.5 $\mu$m, the output signal becomes a sinusoidal wave signal having 0.25 go wave length as one cycle. It is possible to obtain a high resolution of 0.01 $\mu$m when the wavelength of the output signal is divided into 25 and interpolation is used.

However, according to the conventional displacement measuring apparatus 50, in order to measure a phase modulation volume based on a shift of the diffraction grating 15 as an interference signal, it is necessary to provide the optical elements having a function of branching a light beam and a function of combining light beams, in addition to the diffraction grating 15. In other words, as main.parts of the optical system, it is necessary to provide the polarizing beam splitter.51 for splitting the light beam emitted from the light source 11 into two light beams based on the polarization components and for making the split light beams incident to the diffraction grating 15 respectively, and the beam splitter 52 for combining the two split light beams together. Further, in order to obtain two phase signals it is necessary to use the quarter-wave plate 17 to give a phase difference of $\pi/2$ between the orthogonal polarized components, and it is necessary to insert the polarizers 53A and 53B before the light sources 18A and 18B respectively. The orthogonal polarized components need to be extracted in this way. Further, as the phase precision of the wave plate 17 influences the measurement precision, it is necessary to provide the wave plate 17 of high precision in order to achieve the measurement of a displacement with high precision.

The polarizing beam splitter 51 and the high-precision wave plate 17 are expensive. In addition, it is also necessary to provide the beam splitter 52 and the plurality of polarizers 53A and 535. As a result, the conventional displacement measuring apparatus 50 has a large number of parts, which leads to an increase in the cost of the apparatus as well as an increase in the size of the optical system of the apparatus.

SUMMARY OF THE INVENTION

In the light of the above-described conventional problems it is an object of the present invention to provide a displacement measuring apparatus capable of decreasing the number of parts of this apparatus, capable of reducing the cost of the apparatus and capable of reducing the size of the apparatus, while maintaining the precision of measuring a displacement.

In order to achieve the above object, according to a first aspect of the present invention, there is provided a displacement measuring apparatus for detecting a displacement of a measured object by using a scale that moves with the movement of the measured object, the displacement measuring apparatus comprising: a coherent light source; a diffraction grating that is marked with lines in a direction perpendicular to a movement direction of the scale and that splits a light beam emitted from the light source into two light beams of a non-diffracted light and a diffracted light; a liquid crystal device that is disposed in an optical path of one of the two light beams, and that modulates the phase of the light beam between areas on a cross-sectional plane perpendicular to a proceeding direction of the light beam, thereby to obtain a desired phase difference in an interference signal between this light beam and the other light beam on the other optical path; reflection mirrors that make the two light beams incident again into an incident point of the diffraction grating respectively; and a photoelectric conversion element that converts an interference light generated by the two light beams recombined by the diffraction grating into a plurality of electric signals corresponding to phase modulation areas of the liquid crystal device, wherein the light source and the photoelectric conversion element are provided on the same one side of two sides sandwiching the diffraction grating and the reflection mirrors and the liquid crystal device are provided on the same other side sandwiching the diffraction grating, that is opposite to the side of the light source and the photoelectric conversion element, and the displacement of the diffraction grating is measured based a plurality of output signals from the photoelectric conversion element.

According to a second aspect of the invention, there is provided a displacement measuring apparatus for detecting a displacement volume of a measured object by using a scale that moves with the movement of the measured object, the displacement measuring apparatus comprising: a coherent light source; a diffraction grating that is marked with lines in a direction perpendicular to a movement direction of the scale and that splits a light beam emitted from the light source into two light beams of a regular-reflection light and a reflection-diffracted light; a liquid crystal device that is disposed on an optical path of one of the two light beams, and that modulates the phase of the light beam between areas on a cross-sectional plane perpendicular to a proceeding direction of the light beam, thereby to obtain a desired phase difference in an interference signal between this light beam and the other light beam on the other optical path; reflection mirrors that make the two light beams incident again into an incident point of the diffraction grating respectively; and a photoelectric conversion element that converts an interference light generated by the two light beams recombined by the diffraction grating into a plurality of electric signals corresponding to phase modulation areas of the liquid crystal device, wherein the light source, the reflection mirror, the liquid crystal device, and the photoelectric conversion element are all provided on the same side of the diffraction grating, and the displacement of the diffraction grating is measured based a plurality of output signals from the photoelectric conversion element.

Further, according to a third aspect of the invention, there is provided a displacement measuring apparatus described in the first or second aspect, the displacement measuring apparatus further comprising: a branching circuit that splits the plurality of output signals from the photoelectric conversion element; a phase difference detecting circuit that detects a phase difference between the split output signals; a corrected-signal generating circuit that calculates a corrected signal to make the phase difference between the output signals $\pi/2$ (rad), and outputs this corrected signal; and a liquid crystal device driving circuit that converts the corrected signal into a voltage signal for correcting a phase of the liquid crystal device, wherein the phase difference between the output signals is always maintained accurately at $\pi/2$ (rad).

DETAILED DESCRIPTION OF THE PREFERRED EMBODIMENTS

The above-described object and other objects, features and advantages will be explained in detail with reference to the attached drawings.

Figure 2:
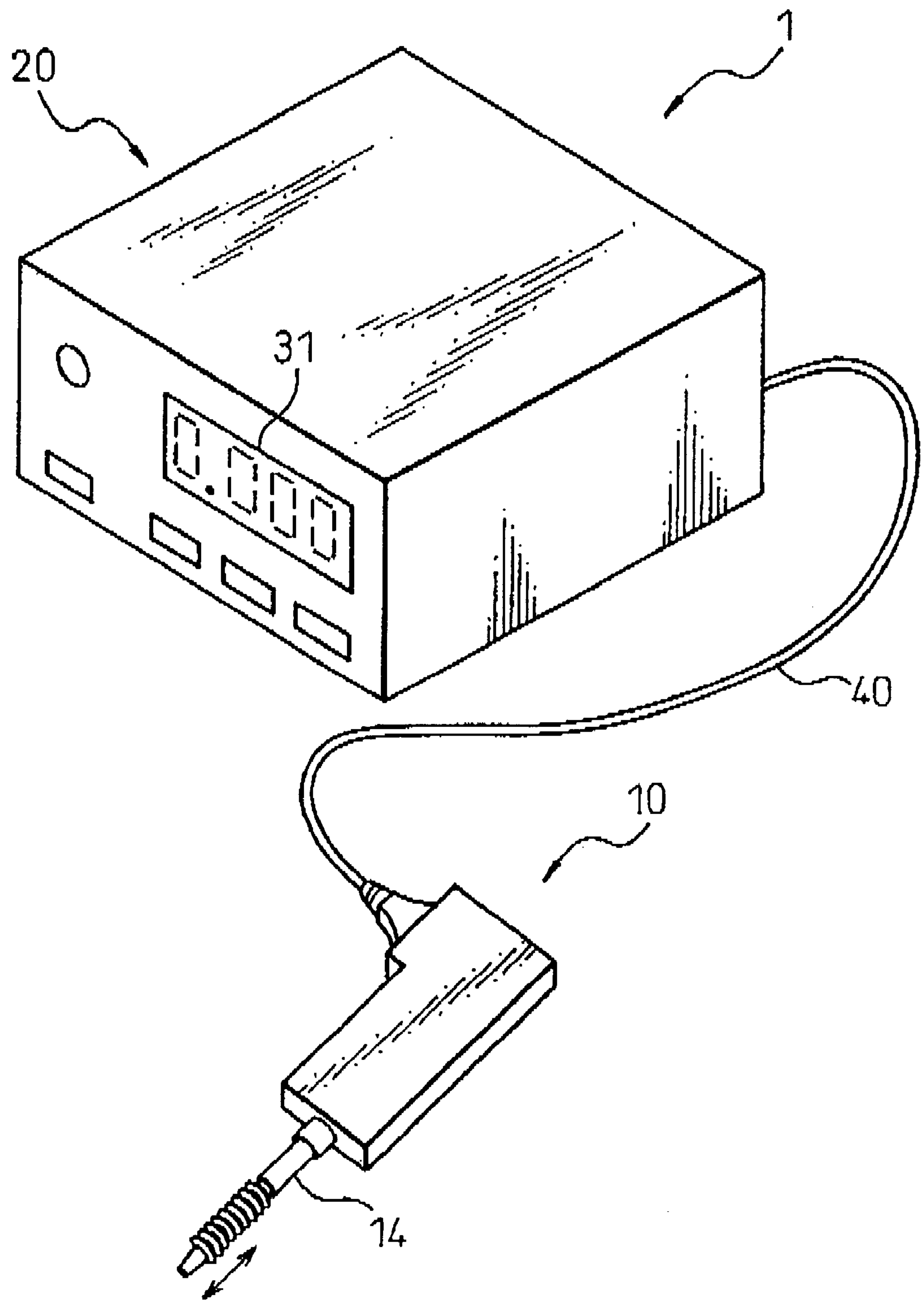
FIG. 2 is a perspective view showing the whole structure of a displacement measuring apparatus according to the present invention.

FIG. 2 is a perspective view showing the whole structure of a displacement measuring apparatus 1 according to one embodiment of the present invention. The displacement measuring apparatus 1 consists of an optical head 10 that detects a displacement of a measured object, and a counter section 20 that is connected to the optical head 10 by a cable 40. The optical head 10 is provided with a scale 14 protruding therefrom. This scale 14 is displaced together with the measured object. The displacement of the measured object measured by the scale 14 is displayed on a display 31 of the counter section 20.

Figure 1:
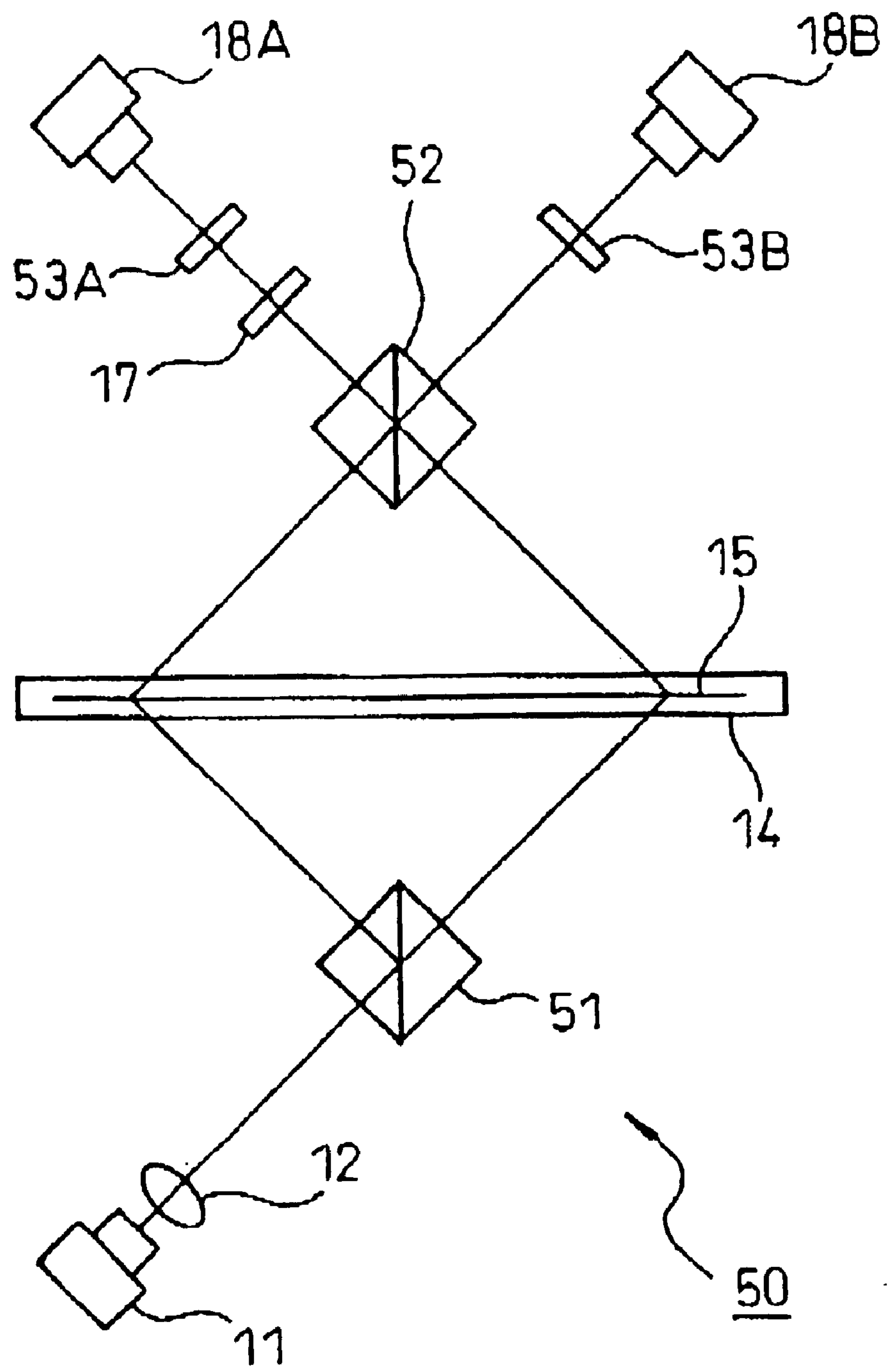
FIG. 1 is a configuration diagram showing a structure of one example of a conventional displacement measuring apparatus.

Two embodiments of the structure of the optical system inside the optical head 10 shown in FIG. 2 will be explained below. In the following explanation of the two embodiments, the parts of the optical system inside the optical head 10 that are the same as those used in the conventional displacement measuring apparatus 50 explained with reference to FIG. 1 are attached with identical reference numbers.

Figure 3:
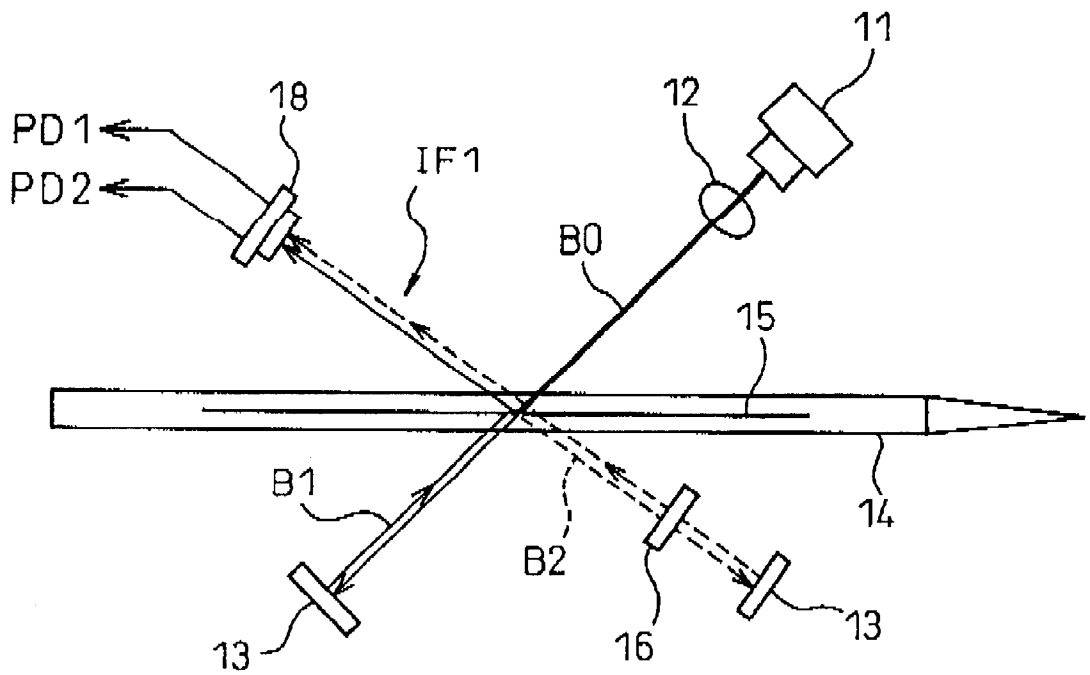
FIG. 3 is a configuration diagram showing an optical system of a displacement measuring apparatus according to a first embodiment of the present invention.

FIG. 3 shows an optical system inside the optical head 10 according to a first embodiment of the present invention. The optical head 10 has the scale 14 shown in FIG. 3. This scale 14 moves with a target member of which the displacement is to be measured. The scale 14 is provided with a diffraction grating 15 marked with lines in a direction perpendicular to the movement direction of the scale 14. On one of two sides sandwiching the scale 14, there is a coherent light source 11 represented by a laser diode. A collimating lens 12 is provided at a side a light beam exits from the light source 11. A photoelectric conversion element 18 is provided in a direction in which a light beam proceeds after it has been emitted from the light source 1 and reflected by the diffraction grating 15. On the other side of the two sides sandwiching the scale 14, there are two reflection mirrors 13. A liquid crystal device 16 is provided between one reflection mirror 13 and the diffraction grating 15. The liquid crystal device 16 is divided into two areas of which the structure will be explained later. The liquid crystal device 16 can modulate the phases of light beams that have passed through these areas.

In the optical system of the first embodiment having the above-described structure, a light beam B0 emitted from the light source 11 is adjusted into a collimated beam by the collimating lens 12, and this collimated beam enters the diffraction grating 15. According to the first embodiment, a light incident to the diffraction grating 15 is made to enter the diffraction grating 15 at a slanted angle in order to avoid such a situation that the incident light from the diffraction grating 15 returns to the light source 11 and this makes the output light unstable, The light beam B0 that has been incident to the diffraction grating 15 is split into a non-diffracted light beam B1 (indicated by a solid line) and a diffracted light beam B2 (indicated by a broken line).

Of the light beam B0, the light beam B1 that proceeds in a straight direction is reflected by the reflection mirror 13 to the incident direction, and returns through the original path and is incident again onto the diffraction grating 15. This returned incident light beam B1 is diffracted by the diffraction grating 15, and is directed to the photoelectric conversion element 18. On the other hand, of the light beam B0, the light beam B2 that is diffracted by the diffraction grating 15 passes through the liquid crystal device 16 and is then reflected by the reflection mirror 13 to the incident direction. This reflected light beam B2 returns through the original route, passes through the liquid crystal device 16 again, and is incident to the diffraction grating 15. This light beam 52 proceeds straight through the diffraction grating 15, and is directed toward the photoelectric conversion element 18. The light beam B2 that passes through the liquid crystal device 16 is phase-modulated by the liquid crystal device 16. Further, according to the first embodiment, the optical system has a structure that is asymmetrical in the left and right directions in order to prevent such a situation that a regularly-reflected light from the diffraction grating 15 is incident to the photoelectric conversion element 18 and this lowers the S/N ratio.

As the two light beams B1 and B2 are subjected to ± first-order diffraction by the diffraction grating 15, the light beams B1 and B2 are inversely phase-modulated with the movement of the diffraction grating 15. Therefore, the two light beams B1 and B2 interfere with each other on the photoelectric conversion element 18. As a result, an intensity modulation is generated based on the movement of the diffraction grating 15. According to the first embodiment, this intensity modulation is converted into an electric signal. Thus, signals PD1 and PD2 are output from the photoelectric conversion element 18 as electric signals. These signals PD1 and PD2 are utilized for measuring the displacement of the scale 14.

Figure 4:
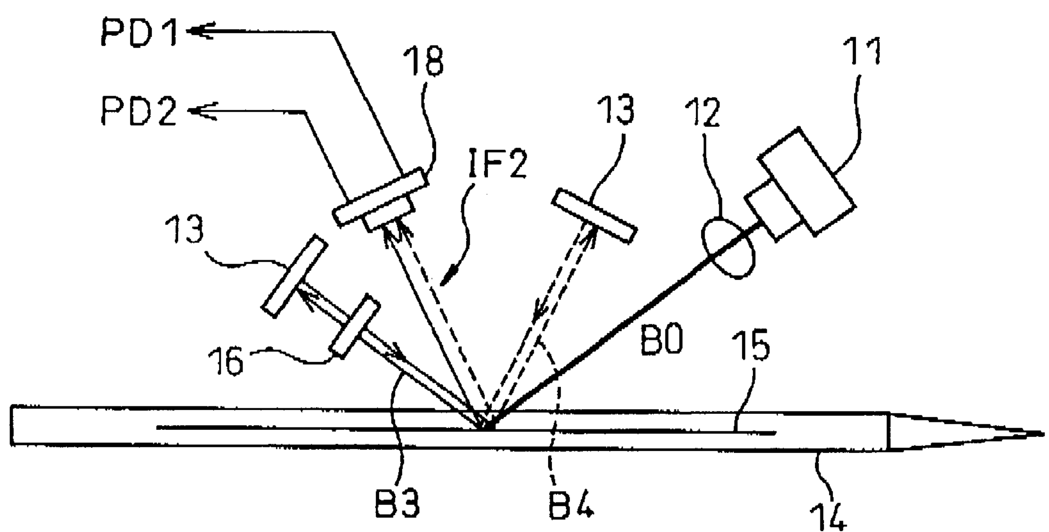
FIG. 4 is a configuration diagram showing an optical system of a displacement measuring apparatus according to a second embodiment of the present invention.

FIG. 4 shows an optical system inside the optical head 10 according to a second embodiment of the present invention. In the second embodiment, a reflection type optical system structure is employed. A reference number 14 denotes a scale that is the same as that shown in FIG. 3. This scale 14 moves with a target member of which the displacement is to be measured, and this scale 14 is also provided with a diffraction grating 15 marked with lines in a direction perpendicular to the movement direction of the scale 14. According to the second embodiment, a coherent light source 11 as represented by a laser diode and a collimating lens 12 at a side a light beam exits from the light source 11, two reflection mirrors 13, a liquid crystal device 16, and a photoelectric conversion element 18, are all provided on only one side of the scale 14.

A light beam B0 emitted from the light source 11 is adjusted into a collimated beam by the collimating lens 12, and this collimated beam enters the diffraction grating 15. In the second embodiment, there is also employed an optical system in which a light incident from the light source 11 enters the diffraction grating 15 at a slanted angle in order to avoid a situation where the incident light from the diffraction grating 15 returns to the light source 11 and this makes the output light of the light source 11 unstable. The light beam B0 that has been incident to the diffraction grating 15 is branched into a regularly-reflected light beam B3 (indicated by a solid line) and a reflection-diffracted light beam B4 (indicated by a broken line).

Of the light beam B0, the regularly-reflected light beam B3 is phase-modulated by the liquid crystal device 16, and is then reflected by the reflection mirror 13 to the incident direction. This reflected light beam B3 returns through the original route, and is phase-modulated again by the liquid crystal device 16. This light beam B3 is then made incident to the diffraction grating 15, is reflection-diffracted, and is then directed toward the photoelectric conversion element 18. In the mean time, of the light beam B0, the light beam B4 that is reflection-diffracted is reflected by the reflection mirror 13 to the incident direction. This reflected light beam B4 returns through the original route, and is incident to the diffraction grating 15 again. The light beam B4 is regularly reflected and is then directed toward the photoelectric conversion element 18. As the two light beams B3 and B4 are subjected to ± first-order diffraction by the diffraction grating 15 respectively, the light beams B3 and B4 are phase-modulated with an inverted sign along with the movement of the diffraction grating 15. Therefore, the two light beams B3 and B4 interfere with each other on the photoelectric conversion element 18. As a result, an intensity modulation is generated based on the movement of the diffraction grating 15. According to the second embodiment, this intensity modulation is converted into an electric signal. Thus, signals PD1 and PD2 are output from the photoelectric conversion element l8 as electric signals. These signals PD1 and PD2 are utilized for measuring the displacement of the scale 14.

In the first and second embodiments, the structures and functions of the light source 11, the collimating lens 12, the reflection mirrors 13, the scale 14, the diffraction grating 15, the liquid crystal device 16, and the photoelectric conversion element 18, respectively, are similar for these two embodiments. In the case of the transmission type displacement measuring apparatus as in the first embodiment, the light source 11 and the reflection mirrors 13 are provided on mutually opposite sides of the diffraction grating 15, and the size of the optical system becomes slightly larger. However, it is possible to dispose the reflection mirrors 13 and the light source 11 to face the photoelectric conversion element 18. On the other hand, in the case of the reflection type displacement measuring apparatus as in the second embodiment, the optical system is concentrated on one side of the diffraction grating 15. Therefore, it is possible to arrange the optical system compactly, with an increased degree of freedom in the disposition. For example, in the case of measuring the displacement of a translation stage, the measurement can be done by only providing the scale of the optical head separately from the optical system, and providing the diffraction grating 15 on the moving surface of the translation stage, with a measurement head closely disposed.

The structural parts of the optical system within the optical head 10 in the first and second embodiments will be explained in further detail.

The scale 14 that is set to move with a member of which the displacement is to be measured is generally provided with a tip portion that is brought into contact with this displacement-measured member, and a main body portion is connected to the tip portion. The scale 14 may be provided with only the main body portion. The scale 14 has a predetermined length. On the main body portion of the scale 14, there is provided a diffraction grating 15 that is marked with lines in a direction perpendicular to the movement direction of the scale 14. As the scale 14 moves in connection with the measured object, it is possible to measure the displacement of the measured object by measuring the displacement of the scale 14.

In the first-order diffracted light diffracted by the diffraction grating 15, a phase term $2\pi d/D$ is superimposed based on the position of the diffraction grating 15, and the phase term thereof is positive or negative based on a difference of a diffraction direction, where d represents a displacement of the diffraction grating and D represents a diffraction grating pitch. Therefore, the respective diffracted lights are simply expressed by the following expressions.

$$u\mathbf{1}=A\text{expi }(\omega t+2\pi d/D) \quad (1)$$

$$u\mathbf{2}=A\text{expi }(\omega t-2\pi d/D) \quad (2)$$

From the expressions (1) and (2), intensity I of the interference light between the ± first-order diffracted lights is given by the following expression.

$$I=|u\mathbf{1}+u\mathbf{2}|^2=2A^2(1+\cos[4\pi d/D]) \quad (3)$$

It can be known from this expression (3) that the intensity I of the interference light changes in a sinusoidal wave shape along with the displacement of the scale 14, and that a change in the intensity of two cycles occurs during the period while the scale 14 displaces the diffraction grating pitch D of the diffraction grating 15.

Figure 5:
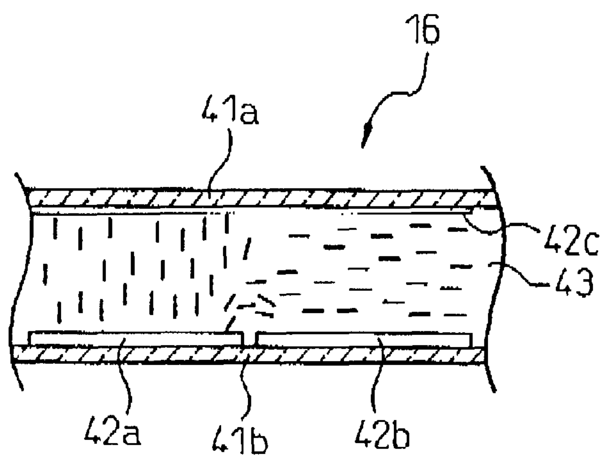
FIG. 5 is a cross-sectional view for explaining a liquid crystal device that is used in the present invention.

One embodiment of the liquid crystal device 16 will be explained with reference to FIG. 5. FIG. 5 shows a cross section of the liquid crystal device 16. This shows a state where a homogenous liquid crystal 43 is sealed into between glass substrates 41*a* and 41*b*. In this embodiment, a transparent common electrode 42*c* is formed on the inner surface of the glass substrate 41*a*, and two transparent control electrodes 42*a* and 42*b* are formed in parallel on the inner surface of the glass substrate 41*b*. While no voltage is being applied to between the upper and lower electrodes, liquid crystal molecules are arranged in parallel with the glass substrates 41*a* and 41*b*. However, when a voltage is applied to between the common electrode 42*c* and one of the opposing control electrodes, for example, the control electrode 42*a*, the liquid crystal molecules are erected along the electric field (in a state that the liquid crystal molecules are perpendicular to the glass substrates 41*a* and 41*b*).

The liquid crystal 43 has a refractive index anisotropy, and diffraction indexes are different between polarization components that are parallel with the long axis direction and the short axis direction of the liquid crystal molecule. Therefore, the phase is modulated when a linearly polarized beam parallel with the liquid crystal particles is incident to the liquid crystal device 16 in a state that the diffraction index has changed due to the application of a voltage to between the common electrode 42*c* and the electrode 42*a*. While FIG. 5 explains the liquid crystal device in the homogenous orientation, it is also possible to use liquid crystal devices of various kinds of modes such as a homeotropic type and a twist-nematic type when an element can be phase-modulated.

The liquid crystal device 16 is divided into two areas (phase areas) by the control electrodes 42*a* and 42*b*. It is possible to adjust a voltage applied to the crystal liquid in each phase area. A Cross section of a light beam diffracted by the diffraction grating 15 extends over these two areas of the liquid crystal device 16. Therefore, it is possible to give a stepped phase modulation to the light beam according to a cross-sectional position of the light beam, by changing liquid crystal driving voltages applied to the control voltages 42 and 42*b* in each area. Thus, it is possible to adjust a phase modulation volume of the light beam, thereby to give a phase difference of $\pi/2$ (rad) to the light beam in the two areas.

Figure 6:
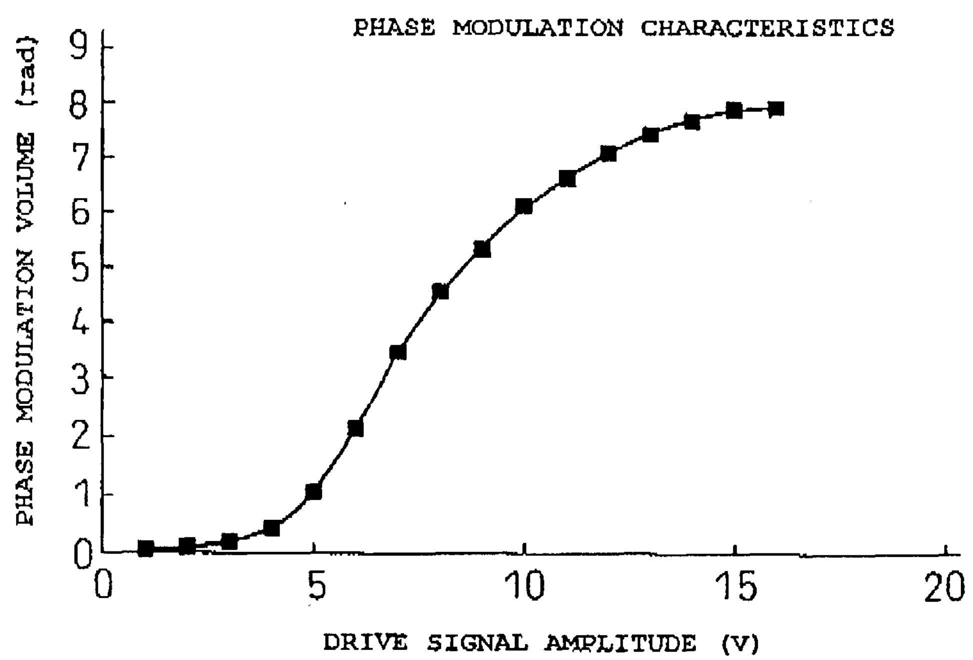
FIG. 6 is a characteristic diagram showing one example of a relationship between a phase modulation volume of the liquid crystal device shown in FIG. 5 and a drive signal amplitude.

FIG. 6 is a characteristic diagram showing one example of a relationship between a phase modulation volume (rad) of the liquid crystal device 16 and a drive signal amplitude (V). In order to prevent a deterioration of the liquid crystal, an AC signal is used for the drive signal. The AC signal is a sinusoidal wave having a sufficiently high frequency that cannot be followed by the liquid crystal molecules. The phase modulation volume (rad) changes in proportion to the amplitude (V) of the drive signal applied to the liquid crystal device 19. The phase modulation volume of $2\pi$(rad) or above is obtained. The amplitude (V) of the drive signal applied to the liquid crystal device 19 is adjusted using the phase modulation characteristics, and the phase difference of $\pi/2$ (rad) is generated to the light beam in the two areas. In the actual optical system, the light beam is transmitted through the liquid crystal device 16 twice in both the first and second embodiments as explained with reference to FIG. 3 and FIG. 4. Therefore, the volume of phase modulation when the light beam passes through the liquid crystal device 16 at one time may be $\pi/4$ (rad), that is a half of the $\pi/2$ (rad).

The photoelectric conversion element 18 has its light-receiving section divided into two or more areas. Electric signals of two phases are obtained corresponding to each phase area of the liquid crystal device 16. When a phase difference between the two phase electric signals is set to $\pi/2$ (rad), it is possible to obtain sinusoidal wave signals of two phases (a sine wave, and a cosine wave) from the photoelectric conversion element 18. Phases of output signals are obtained from these two signals. Based on the two signals, it is possible to carry out an interpolation of the displacement having pitches smaller than those of the diffraction grating 15. Therefore, when the phase difference between the output signals of two phases is deviated from $\pi/2$ (rad), an interpolation error occurs, which becomes a cause of lowering the measurement precision.

As one of reasons for a deviation of a phase difference between the output signals of two phases from the desired value of $\pi/2$ (rad), there is considered a distortion of various optical parts that constitute the optical system attributable to the precision of the planes and changes in temperature. There is a limit to the reduction in phase difference errors by improving the precision of the parts of the optical system and various adjustments. Therefore, in order to eliminate the influence of errors in the parts of the optical system and the lapse of time, the liquid crystal device 16 carries out a phase modulation in real time, and the phase difference between the two phase signals is accurately maintained at $\pi/2$ (rad). Thus, the measurement precision is maintained high.

Figure 7:
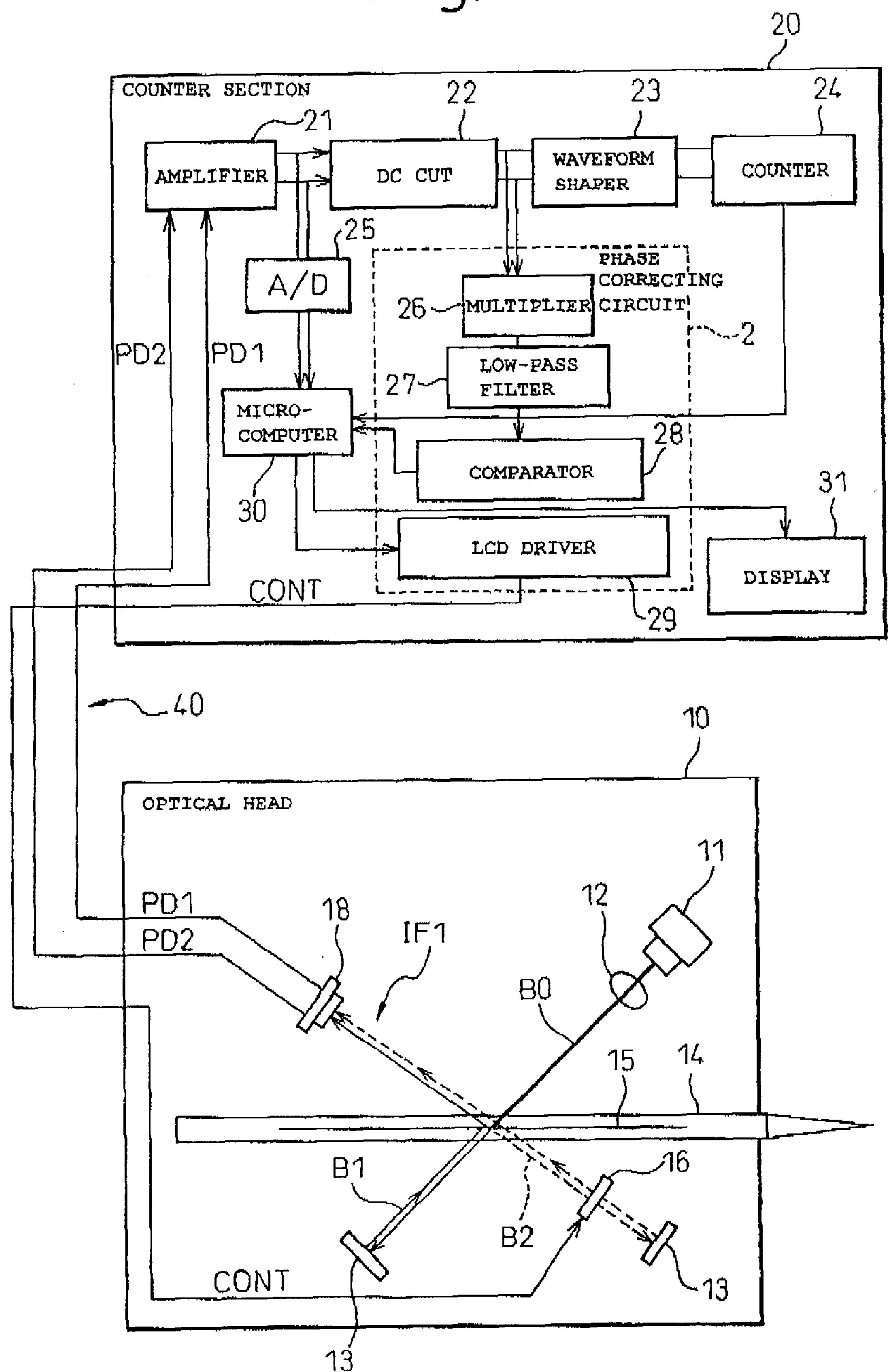
FIG. 7 is a configuration diagram showing an internal structure of an optical head and a counter section that constitute the displacement measuring apparatus of the present invention shown in FIG. 2.

FIG. 7 is a configuration diagram showing an internal structure of the optical head 10 and the counter section 20 that constitute the displacement measuring apparatus 1 of the present invention shown in FIG. 2. The optical head 10 employs the optical system explained with reference to FIG. 3 and, therefore, the explanation thereof will be omitted here.

The counter section 20 includes an amplifier circuit 21, a DC cut circuit 22, a waveform shaping circuit 23, a counter 24, an A/D converter 25, a multiplier circuit 26, a low-pass filter 27, a comparator 28, an LCD driver 29, a microcomputer 30, and a display unit 31, Signals PD1 and PD2 that are output from a photoelectric conversion element 18 of the optical head 10 are input to the amplifier circuit 21 of the counter section 20 through a cable 40. A drive signal CONT for driving a liquid crystal device output from the LCD driver 29 of the counter section 20 is applied to a liquid crystal device 16 of the optical head 10 through the cable 40.

In the counter section 20, the amplifier circuit 21 amplifies the signals PD1 and PD2 that have been input from the photoelectric conversion element 18 of the optical head 10, and the DC cut circuit 22 removes the DC component from these signals. Then, the waveform shaping circuit 23 shapes the waveforms of these signals, and inputs the signals into the counter 24. The outputs of the amplifier circuit 21 are also input to the microcomputer 30 through the A/D converter 25. The counter 24 counts the number of cycles of the two signals PD1 and PD2, and sends the counted values to the microcomputer 30. The microcomputer 30 interpolates fine displacement values within one cycle from an output ratio of the two-phase signals that have been taken in after the A/D conversion. The microcomputer 30 then calculates a displacement by combining the interpolation with the above counted values, and makes the display unit 31 display the displacement of a measured object.

The drive signal CONT of the liquid crystal device 16 within the optical head 10 is generated by a phase correcting circuit 2 that processes branched signals of the output of the DC cut circuit 22. The phase correcting circuit 2 consists of the multiplier circuit 26 that receives the split signals output from the DC Cut circuit 22, the low-pass filter 27 for controlling the band of a multiplied signal, the comparator 28 for calculating the phase difference between input signals, and the LCD driver 29 for converting a signal from the microcomputer 30 into the drive signal CON of the liquid crystal device 16.

Figure 10:
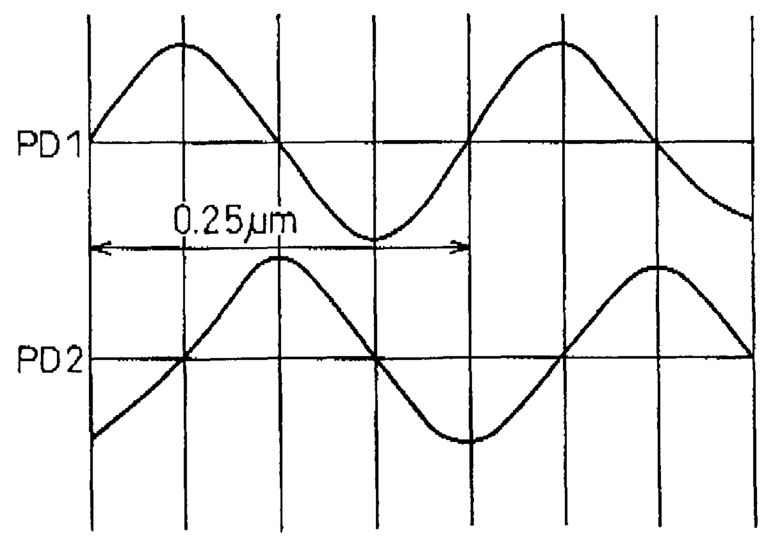
FIG. 10 is a waveform diagram showing an output waveform obtained from a photoelectric conversion element of the optical head shown in FIG. 2 and FIG. 7.

One example of a phase correction method in the liquid crystal device 16 according to the phase correcting circuit 2 will be explained in detail below. The two phase sinusoidal wave signals PD1 and PD2 (reference FIG. 10) from the photoelectric conversion element 18 that have been amplified and DC cut are then multiplied by the multiplier circuit 26. The DC component is removed from these signals by the low-pass filter 27. The two phase signals PD1 and PD2 are the sinusoidal wave signals with the phase difference of $\pi/2$ (rad), and they can be expressed as follows.

$$PD1=A\sin(\omega t+\theta) \tag{4}$$

$$PD2=A'\sin(\omega t+\theta') \tag{5}$$

From the expressions (4) and (5), the above multiplied signal can be given as shown in the expression (6).

$$B[\cos(\theta-\theta')-\cos(2\omega t+\theta+')] \tag{6}$$

From this, the DC component (first term) extracted from the low-pass filter 27 is intensity changed in a sinusoidal shape based on the phase difference between the two-phase signals. When the phase difference is of $\pi/2$ (rad), the DC component becomes zero. Therefore, when a feedback is made to the drive signal CON of the liquid crystal device 16 by the comparator 28 and the microcomputer 30 so that the output becomes equal to zero, it is possible to obtain two phase signals of which phase difference is $\pi/2$ (rad). As a result, it is possible to carry out phase correction in real time.

Figure 8:
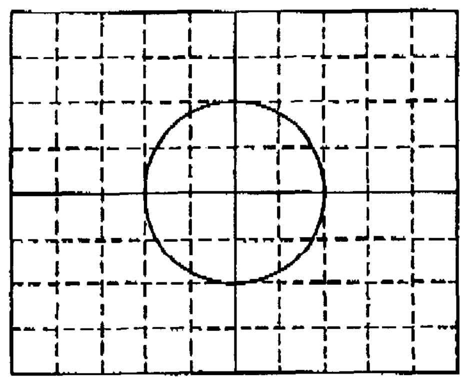
FIG. 8 is a waveform diagram showing a Lissajous's figure based on two-phase signals when a phase correction has been carried out.
Figure 9:
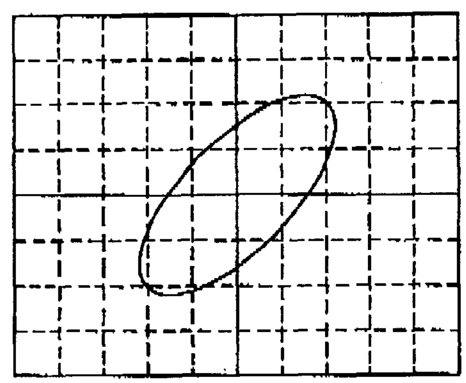
FIG. 9 is a waveform diagram showing a Lissajous's figure based on two-phase signals when a phase correction has not been carried out.

FIG. 8 and FIG. 9 show Lissajoust's figures. FIG. 8 shows a case where a phase correction has been carried out by the liquid crystal device 16, and FIG. 9 shows a case where a phase correction has not been carried out by the liquid crystal device 16. Thus, when a phase correction is carried out using the phase correcting circuit 2, it is possible to adjust the phase difference within a range of $\pi/2\pm\pi/50$. As a result, it is possible to achieve a measurement precision in the order of nm in the displacement measuring apparatus.

Industrial Applicability

As explained in the above two embodiments, according to the present invention, the function of splitting a light beam into two light beams and the function of combining two light beams into one light beam are provided to the diffraction grating that gives displacement information to two light beams as a phase modulation volume. with this arrangement, it is possible to reduce the number of parts of the optical system. Further, as a method of obtaining two phase signals, the liquid crystal device is used to divide a light beam into two based on a difference of the light beam at cross-sectional positions, as against the conventional method of dividing the light beam into two phase signals between orthogonal polarization components. Therefore, according to the present invention, it is not necessary to provide polarizers and elements for controlling the polarized state of the wave plates. Thus, it is possible to reduce the number of parts of the optical system. As a result, according to the present invention, it is possible to provide a displacement measuring apparatus capable of decreasing the number of parts of the apparatus, capable of reducing the cost of the apparatus and capable of reducing the size of the apparatus, while maintaining the precision of measuring a displacement.

Further, according to the present invention, it is possible to apply a large number of displacement measuring apparatuses for measuring the displacement of various objects. For example, it is possible to apply the displacement measuring apparatuses for measuring a distortion of the body of an aircraft, measuring a displacement of supporting units of a bridge, measuring a distortion of a track rail for an elevator, etc.

What is claimed is:

1. A displacement measuring apparatus for detecting a displacement of a measured object by using a scale that moves with the movement of the measured object, the displacement measuring apparatus comprising:

a coherent light source;

a diffraction grating that is marked with lines in a direction perpendicular to a movement direction of the scale and that splits a light beam emitted from the light source into two light beams of a non-diffracted light and a diffracted light;

a liquid crystal device that is disposed on an optical path of one of the two light beams, and that modulates the phase of the light beam between areas on a cross-sectional plane perpendicular to a proceeding direction of the light beam, thereby to obtain a desired phase difference in an interference signal between this light beam and the other light beam on the other optical path;

reflection mirrors that make the two light beams incident again into an incident point of the diffraction grating; and a photoelectric conversion element that converts an interference light between the two light beams recombined by the diffraction grating into a plurality of electric signals corresponding to phase modulation areas of the liquid crystal device, wherein the light source and the photoelectric conversion element are provided on the same one side of two sides sandwiching the diffraction grating and the reflection mirrors and the liquid crystal device are provided on the same other side sandwiching the diffraction grating, that is opposite to the side of the light source and the photoelectric conversion element, and the displacement of the diffraction grating is measured based on a plurality of output signals from the photoelectric conversion element;

said apparatus further comprising:

a branching circuit that splits the plurality of output signals from the photoelectric conversion element;

a phase difference detecting circuit that detects a phase difference between the split output signals;

a corrected-signal generating circuit that calculates a corrected signal to make the phase difference between the output signals to $\pi/2$ (rad), and outputs this corrected signal; and a liquid crystal device driving circuit that converts the corrected signal into a voltage signal for correcting a phase of the liquid crystal device, wherein the phase difference between the output signals is always maintained accurately at $\pi/2$ (rad).

2. A displacement measuring apparatus for detecting a displacement amount of a measured object by using a scale that moves with the movement of the measured object, the displacement measuring apparatus comprising:

a coherent light source;

a diffraction grating that is marked with lines in a direction perpendicular to a movement direction of the scale and that splits a light beam emitted from the light source into two light beams of a regular-reflection light and a reflection-diffracted light;

a liquid crystal device that is disposed on an optical path of one of the two light beams, and that modulates the phase of the light beam between areas on a cross-sectional plane perpendicular to a proceeding direction of the light beam, thereby to obtain a desired phase difference in an interference signal between this light beam and the other light beam on the other optical path;

reflection mirrors that make the two light beams incident again into an incident point of the diffraction grating; and a photoelectric conversion element that converts an interference light between the two light beams recombined by the diffraction grating into a plurality of electric signals corresponding to phase modulation areas of the liquid crystal device, wherein the light source, the reflection mirror, the liquid crystal device, and the photoelectric conversion element are all provided on the same side of the diffraction grating, and the displacement of the diffraction grating is measured based on a plurality of output signals from the photoelectric conversion element;

said apparatus further comprising:

a branching circuit that splits the plurality of output signals from the photoelectric conversion element;

a phase difference detecting circuit that detects a phase difference between the split output signals;

a corrected-signal generating circuit that calculates a corrected signal to make the phase difference between the output signals to $\pi/2$ (rad), and outputs this corrected signal; and a liquid crystal device driving circuit that converts the corrected signal into a voltage signal for correcting a phase of the liquid crystal device, wherein the phase difference between the output signals is always maintained accurately at $\pi/2$ (rad).

* * * * *